(12) United States Patent
Byskov

(10) Patent No.: US 8,501,014 B2
(45) Date of Patent: Aug. 6, 2013

(54) DOWN HOLE SEPARATOR AND FAST FLOW OIL SKIMMER

(75) Inventor: Tommy Byskov, Sjaellands Odde (DK)

(73) Assignees: Tommy Byskov, Sjaellands Odde (DK); Thomas M. Haselton, Palanga (LT)

( * ) Notice: Subject to any disclaimer, the term of this patent is extended or adjusted under 35 U.S.C. 154(b) by 215 days.

(21) Appl. No.: 12/668,629

(22) PCT Filed: Jul. 14, 2008

(86) PCT No.: PCT/DK2008/000268
§ 371 (c)(1),
(2), (4) Date: Jan. 11, 2010

(87) PCT Pub. No.: WO2009/010063
PCT Pub. Date: Jan. 22, 2009

(65) Prior Publication Data
US 2010/0193446 A1 Aug. 5, 2010

(30) Foreign Application Priority Data
Jul. 13, 2007 (EP) .................................. 07388054

(51) Int. Cl.
*B01D 17/025* (2006.01)
*B01D 17/02* (2006.01)

(52) U.S. Cl.
CPC ................................ *B01D 17/0211* (2013.01)
USPC ........... 210/744; 210/801; 210/104; 210/521; 210/540

(58) Field of Classification Search
USPC .................. 210/744, 801, 802, 104, 521, 522, 210/532.1, 533, 538, 540
See application file for complete search history.

(56) References Cited

U.S. PATENT DOCUMENTS

| 1,612,557 | A | * | 12/1926 | Weisgerber | .................... 210/540 |
| 1,920,468 | A | | 8/1933 | Jones | |
| 2,799,645 | A | * | 7/1957 | Musgrove | ..................... 210/801 |

(Continued)

FOREIGN PATENT DOCUMENTS

EP 0544059 6/1993

OTHER PUBLICATIONS

International Search Report on related PCT application (PCT/DK2008/000268); International Searching Authority (EPO) dated Dec. 1, 2008.

*Primary Examiner* — Christopher Upton
(74) *Attorney, Agent, or Firm* — Klein, O'Neill & Singh, LLP

(57) ABSTRACT

A separation unit for separating oil from oily water has a first oil to water ratio and the separation unit comprises a body which defines an inner chamber and which has a first end-wall and an opposite second end-wall and first and second sidewalls that extend between the first end-wall and the second end-wall. The inner chamber is at least partly delimited by the first end-wall and the second end-wall, the first side-wall and the second side-wall. The separation unit further comprises a third wall which constitutes a separation wall extending from the first end-wall towards the second end-wall and divides the inner chamber into a first and a second sub-chamber. An inlet is defined at the first side-wall and the first end-wall and a first outlet is defined at the second side-wall and the first end-wall. A passage is defined at the third wall and the second end-wall and a fluid path from the inlet which passes through the first sub-chamber and the passage and the second sub-chamber to the first outlet. A second outlet is defined at the second end-wall, the second outlet defining an opening having an outlet area. The fluid has a restricted flow at the first outlet compared to the flow at the inlet so that a fraction of the fluid is separated from the fluid path through the second outlet. The fraction has a second oil to water ratio which is higher than the first oil to water ratio.

27 Claims, 7 Drawing Sheets

(56) References Cited

U.S. PATENT DOCUMENTS

| | | | |
|---|---|---|---|
| 2,826,306 A | 3/1958 | Burns | |
| 4,308,136 A * | 12/1981 | Warne, Jr. | 210/540 |
| 4,425,239 A | 1/1984 | Jacocks et al. | |
| 4,802,978 A * | 2/1989 | Schmit et al. | 210/104 |
| 4,844,819 A * | 7/1989 | Norman | 210/801 |
| 4,915,823 A * | 4/1990 | Hall | 210/521 |
| 5,032,273 A * | 7/1991 | Senyard et al. | 210/521 |
| 5,132,010 A * | 7/1992 | Ossenkop | 210/522 |
| 5,718,015 A | 2/1998 | Rohrbacher | |
| 6,074,557 A | 6/2000 | Lyles, Sr. et al. | |
| 6,568,541 B2 * | 5/2003 | Koreis et al. | 210/521 |
| 2005/0258089 A1 * | 11/2005 | Foong et al. | 210/540 |

* cited by examiner

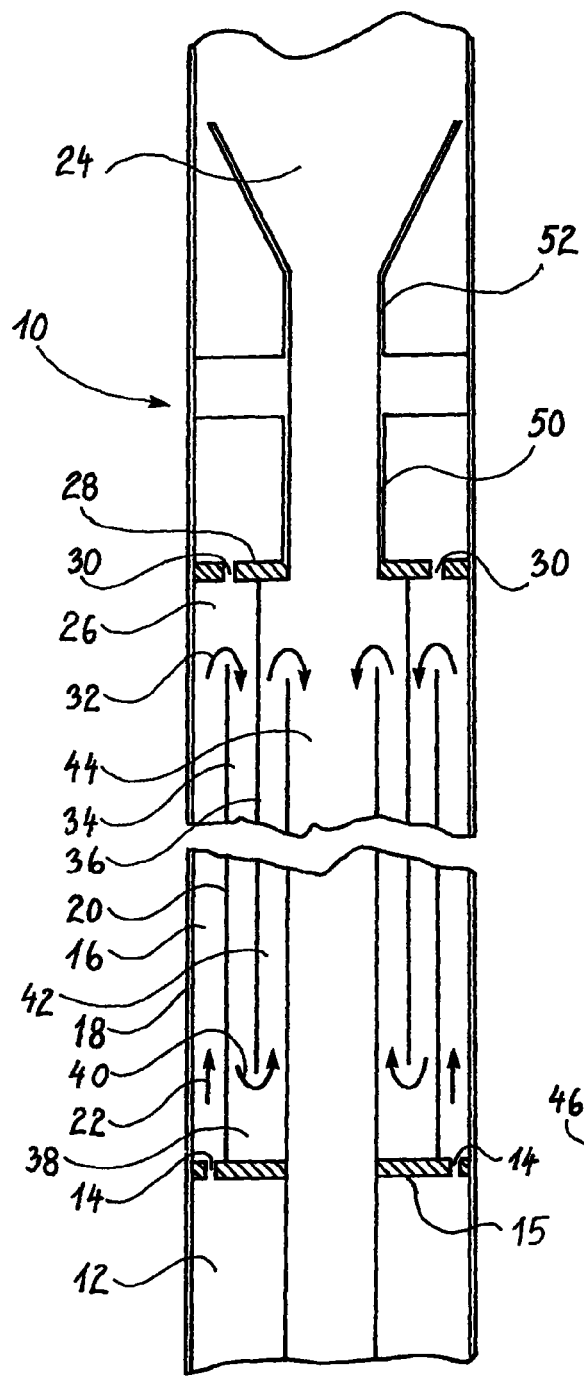
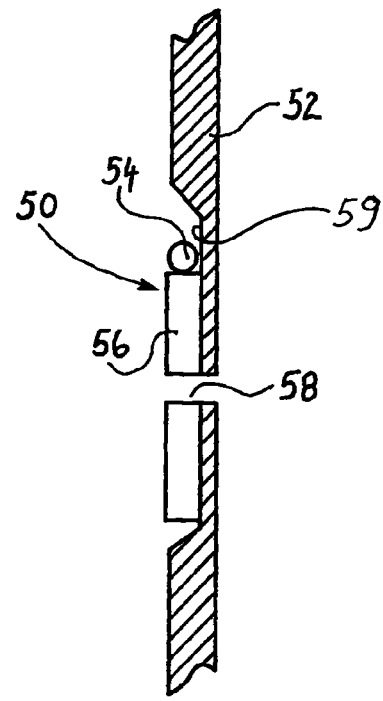
Fig. 2
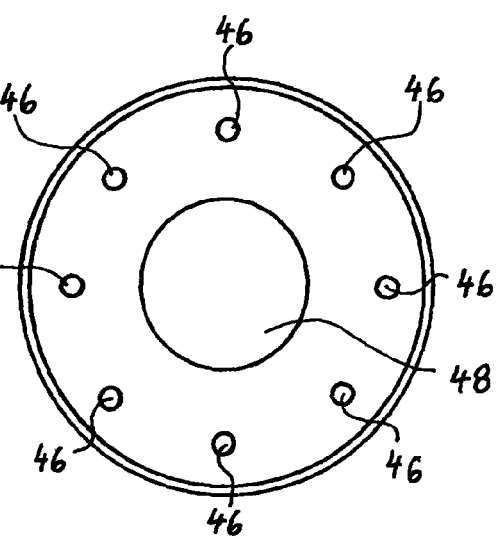
Fig. 3
Fig. 1

DOWN HOLE SEPARATOR AND FAST FLOW OIL SKIMMER

CROSS-REFERENCE TO RELATED APPLICATION

This application is a national phase filing, under 35 U.S.C. §371(c), of International Application No. PCT/DK2008/000268, filed Jul. 14, 2008, the disclosure of which is incorporated herein by reference in its entirety.

FEDERALLY SPONSORED RESEARCH OR DEVELOPMENT

Not Applicable

The present invention relates to a separator unit for separating oil from oily water. The present invention further relates to a system comprising a plurality of separator units for separating oil from oily water and still further to a method for separating oil from oily water.

BACKGROUND

The fluid extracted from a borehole or oil well is usually a mix of numerous materials, including sand, rocks, mud, water, oil, gas and possibly other materials, some of which it is possible to mechanically filter out.

As no two oil wells are identical, the output and quality or state of the fluid extracted from the well is different for each specific oil well. However, one thing is common for all oil wells, namely, that the fluid comprises a mix of water and oil. When retrieving fluid from an oil well or borehole, the retrieved fluid comprises oil mixed with, usually, a considerable amount of water. This is not a desirable mix, as the water in this context may be considered a contamination, or unwanted part, of the fluid extracted from the oil well.

The water separated from the fluid from the oil well is usually to be disposed of in an environmentally safe manner. If the remainder of the fluid is to be pumped into the sea surrounding an oil rig, there may be specific requirements set by laws requiring the content of oil in the water to be below a certain level.

As outlined above, there is a need for an efficient method and/or device for separating oil from the oil/water mix from an oil well.

Publications such as EP 0544 059A, U.S. Pat. No. 4,425,239, U.S. Pat. No. 1,920,468, U.S. Pat. No. 2,826,306, U.S. Pat. No. 5,730,871, U.S. Pat. No. 6,074,557, U.S. Pat. No. 6,080,312 and U.S. Pat. No. 6,730,236 describe devices and method for separating two liquid mediums. Reference is made to the above US patent publications, all of which are hereby incorporated in the present specification by reference in their entirety for all purposes.

SUMMARY OF THE INVENTION

A first aspect of the present invention relates to a separation unit for separating oil from oily water having a first oil to water ratio, the separation unit may comprise:
- a housing defining an inner chamber and having a first end-wall constituting a bottom end wall and an opposite second end-wall constituting a top end-wall, one or more side-walls extending between said first end-wall and said second end-wall, said inner chamber being at least partly delimited by said first end-wall, said second end-wall, and said one or more side-walls,
- a first set of separation walls extending from said first end-wall towards said second end-wall and defining a first set of fluid passages below said second end-wall and above each of said separation walls of said first set,
- a second set of separation walls extending from said second end-wall towards said first end-wall and defining a second set of fluid passages above said first end-wall and below each of said separation walls of said second set, said second set of separation walls being interlayered between said first set of separation walls,
- an inlet defined in one of said side-walls and at said first end-wall or alternatively defined in said first end-wall,
- a first outlet defined in one of said side-walls and at said first end-wall or alternatively defined in said first end-wall,
- a further set of outlets defined in said second end-wall above each of said separation walls of said first set of separation walls, and
- a fluid path extending from said inlet to said first outlet within said inner chamber passing said first set of fluid passages and said second set of fluid passages and having a gradually increasing flow restriction from said inlet to said first outlet so as to separate fractions of said fluid from said fluid path to said second set of outlets having higher oil to water ratios than said first oil to water ratio and so as to expel fluid from said first outlet having a lower oil to water ratio than said first oil to water ratio.

The unit according to the first aspect of the present invention is to be used for removing oil and possibly other contamination from water or alternatively and preferably for removing water from oil. The unit may be used in the oil industry for separating oil from the fluid being extracted from an oil well.

The unit may advantageously be incorporated in a larger device comprising a plurality of such units for thereby obtaining an even better separation of oil from oily water, as will be discussed in greater detail in relation to the second aspect of the present invention below.

When a plurality of units is assembled as a larger system, the walls may be constituted by coherent or unitary walls and/or share common walls. In a larger system, the units may be considered as integrated parts of the larger system. The inlet and first outlet may be in fluid communication with other similar units, e.g. the first outlet of a first one unit may be in fluid communication with an inlet of a second unit. Such an arrangement may be established by a common wall wherein an opening is formed.

Advantageously the first and/or second outlet and/or the inlet may define a slit geometry, a substantial rectangular geometry, a substantial square geometry or a substantial round geometry. The geometry of the outlets and/or inlets may have some influence on the flow through the unit. The geometry may also be chosen on the basis of easy manufacturing and/or mechanical stability of the unit.

The basic teachings of the present invention are based on the fact, that the gradually increasing flow restriction from the inlet to the outlet in the fluid path causes the separation of fluid having a higher oil to water ratio than the fluid input into the separation unit through the first inlet. It is contemplated, that the separation of fluid through the further set of outlets is established due to the difference in density between oil and water as the density of water is higher than the density of oil and the gradual increase in flow restriction along the fluid path consequently presses fluid out from the fluid path at the second end-wall constituting the top-wall producing and expelling through the further outlets fluid having a higher percentage of oil as compared to the fluid originally input through the inlet.

The separation walls of the first and second sets may advantageously define a plurality of individual sub chambers between the first inlet and first outlet which sub chambers are linked through the first and second set of fluid passages above and below the first and second set of separation walls, respectively.

The number of separation walls included in the first set and the second set of separation walls may be identical or different and the number of separation walls included in the second set may be larger than the number of separation walls included in the first set. However, according to the presently preferred embodiment of the separation unit according to the first aspect of the present invention, the first set of separation walls includes a first number of separation walls, the second set of separation walls includes a second number of separation walls, and the second number is one integer lower than the first number, consequently providing a separation unit in which the inlet and the first outlet communicate with the inner chamber through sub chambers further communicating with additional sub chambers of the inner chamber fluid passages belonging to the first set fluid passages.

The gradually increasing flow restriction along the fluid path may be established in any relevant way e.g. by flow restrictions, otherwise however, according to the presently preferred embodiment of the separation unit according to the first aspect of the present invention, the gradually increasing flow restriction along the fluid path is established by a volumetric reduction of the volume of the sub chambers along the fluid path. According to a further embodiment of the separation unit according to the first aspect of the present volumetric reduction may be of the order of 0.5%-50%, such as 1-25% or 5-25% from one sub chamber to the succeeding sub chamber.

In a particular embodiment of the present invention the first end-wall may be constituted by two separate walls being positioned displaced relative to each other. The two walls may then define an opening between them, thereby establishing an inlet.

A specific embodiment of the present invention includes the first end-wall and the second end-wall being arranged so as to define an angle between 0 degrees and 90 degrees, such as approximately 45 degrees. The unit may be positioned in an arrangement of a plurality of units together forming e.g. a round, circular, oblong or stepped structure.

Further advantageously the unit may further comprise an oil sensor for sensing presence of oil in the fluid and a valve at the first outlet, the valve being selectively operated from a closed state to an open state in response to a signal from the oil sensor indicating presence of oil in the fluid. It is contemplated to be advantageous to have a sensor for detecting the presence of oil in the fluid so that a valve may be selectively operated to let oil pass through the first outlet. The sensor may be any sensor suitable for detecting oil in a fluid.

Still further advantageously, the unit may include a pump, which may be connected at the inlet for establishing an elevated pressure in the fluid inside the separation unit. The pump may be used to elevate the pressure inside the unit or to pump more liquid into the unit, so as to ensure that a substantially constant pressure is maintained.

A second aspect of the present invention relates to a system for separating oil from oily water having a first oil to water ratio, said system including:

a plurality of separation units, each of said separation units comprising:

a housing defining an inner chamber and having a first end-wall constituting a bottom end wall and an opposite second end-wall constituting a top end-wall, one or more side-walls extending between said first end-wall and said second end-wall, said inner chamber being at least partly delimited by said first end-wall, said second end-wall, and said one or more side-walls, a first set of separation walls extending from said first end-wall towards said second end-wall and defining a first set of fluid passages below said second end-wall and above each of said separation walls of said first set, a second set of separation walls extending from said second end-wall towards said first end-wall and defining a second set of fluid passages above said first end-wall and below each of said separation walls of said second set, said second set of separation walls being interlayered between said first set of separation walls, an inlet defined in one of said side-walls and at said first end-wall or alternatively defined in said first end-wall, a first outlet defined in one of said side-walls and at said first end-wall or alternatively defined in said first end-wall, a further set of outlets defined in said second end-wall above each of said separation walls of said first set of separation walls, and a fluid path extending from said inlet to said first outlet within said inner chamber passing said first set of fluid passages and said second set of fluid passages and having a gradually increasing flow restriction from said inlet to said first outlet so as to separate fractions of said fluid from said fluid path to said second set of outlets having higher oil to water ratios than said first oil to water ratio and so as to expel fluid from said first outlet having a lower oil to water ratio than said first oil to water ratio, and said plurality of separation units arranged so that in a set of neighbouring separation units an inlet of one separation unit is in fluid communication with a second outlet of the other separation unit, The system according to the second aspect of the present invention may be construed as a system comprising a plurality of the units according to the first aspect of the present invention.

In the system each of the first end-walls may constitute a continuous wall, e.g., a top wall if the unit is placed on a surface, e.g., the ground or on an oil rig or barge. Similarly the second end-wall may constitute a continuous wall, e.g. a bottom surface.

In one advantageous embodiment of the present invention the system may define an overall box geometry. In such an embodiment the plurality of separation units may be positioned sequentially along the length of the overall box geometry. The box geometry may be preferred in embodiments where the system is to be used over ground e.g. placed on the surface of the ground or the like.

In another advantageous embodiment of the present invention each unit of the system may define an overall circular geometry. In such an embodiment the separation units may be positioned concentric relative to a centre axis of the cylindrical geometry. The circular geometry may be preferred for embodiments of the present invention where the system is to be positioned down-hole in an oil well or bore hole. In a further advantageous embodiment the system defines a circular geometry at a cross section and overall a cylindrical geometry.

In a particular advantageous embodiment of the present invention the second outlet of a first separation unit is connected to a inlet of a second separation unit.

The gradual reduction of volume along the fluid path is contemplated to ensure that the pressure in the liquid or fluid is maintained throughout the system. Oil is less dense than water and it is contemplated that the oil in the fluid mix will flow nearer the outlets than the water, so that the oil may be separated from the fluid, or at least that the fluid separated has a substantially higher oil to water ratio than the fluid not being separated.

Preferably the separation unit may be made from a non-corrosive material, such as stainless steel or any other suitable material. The material may be chosen depending on the intended use. There may be different requirements as to resistance to corrosion when the system is positioned in a bore hole compared to when the system is positioned at ground level.

In a specific embodiment of the present invention the system may further comprise an oil sensor for sensing presence of oil in the fluid, a valve at the first outlet, the valve being selectively operated from a closed state to an open state in response to a signal from the oil sensor indicating presence of oil in the fluid.

The presence of a combination of a sensor and a valve being selectively operated in response to a signal from the sensor is contemplated to improve the quality or efficiency of the separation, as the valve ensures that fluid is separated trough the outlet only when oil is present in the fluid.

Further the system may advantageously comprise an oil sensor for sensing presence of oil in the fluid at each of the plurality of second outlets and a valve at a corresponding second outlet, each of the valves being selectively operated from a closed state to an open state in response to a signal from a specific one of the oil sensors indicating presence of oil in the fluid at a respective second outlet. The system thus comprises a set of a sensor and valve at each of the outlets. Preferably the sensor is positioned near or at the outlet so as to improve the effect of the sensor/valve combination.

It is a further advantage that the separation unit according to the present invention may include a pump that may be connected at the inlet for establishing an elevated pressure in the fluid inside the separation unit. Further or alternatively a pump may be positioned at one outlet for ensuring that fluid is extracted or expelled from the outlet. A pump may be positioned or connected at the first and/or the second outlet.

The system according to the second aspect of the present invention may include any of the features mentioned in connection with the first aspect of the present invention.

A third aspect of the present invention relates to a method for separating oil from oily water having a first oil to water ratio comprising:
  providing an oily water stream from an oily water source, said oily water stream having a first oil to water ratio,
  providing a separation unit comprising:
    a housing defining an inner chamber and having a first end-wall constituting a bottom end wall and an opposite second end-wall constituting a top end-wall, one or more side-walls extending between said first end-wall and said second end-wall, said inner chamber being at least partly delimited by said first end-wall, said second end-wall, and said one or more side-walls,
    a first set of separation walls extending from said first end-wall towards said second end-wall and defining a first set of fluid passages below said second end-wall and above each of said separation walls of said first set,
    a second set of separation walls extending from said second end-wall towards said first end-wall and defining a second set of fluid passages above said first end-wall and below each of said separation walls of said second set, said second set of separation walls being interlayered between said first set of separation walls,
    an inlet defined in one of said side-walls and at said first end-wall or alternatively defined in said first end-wall,
    a first outlet defined in one of said side-walls and at said first end-wall or alternatively defined in said first end-wall,
    a further set of outlets defined in said second end-wall above each of said separation walls of said first set of separation walls, and
    a fluid path extending from said inlet to said first outlet within said inner chamber passing said first set of fluid passages and past said second set of fluid passages and having a gradually increasing flow restriction from said inlet to said first outlet,
  separating fractions of said fluid from said fluid path to said second set of outlets having higher oil to water ratios than said first oil to water ratio, and
  expelling fluid from said first outlet having a lower oil to water ratio than said first oil to water ratio, The unit used in the method according to the third aspect of the present invention may be dimensioned relative to the properties of the specific well from which fluid is to be separated. As mentioned above not two oil wells are identical, as the content depends on factors as geological surroundings, amount of organic material originally present in the area, presence of water, salt, sand and other compounds. Determination of well properties is not an exact science and usually based on experience of the persons drilling for oil.

The unit used for separating oil from the oily water may be positioned in an oil well, bore hole, or at ground level or at sea level, e.g. above sea level on an oil rig or barge.

The oil separated from the oily water may be collected in a container or other storage facility for later or further processing or transport. The remaining part of the fluid may be collected in a separate storage tank or container. Alternatively, the remaining part may be pumped back into the oil well or borehole. Further alternatively the fluid may be reintroduced into the separation tank. In one embodiment of the present invention the unit and/or system according to the first and second aspect respectively may include a return pipe or conduit for establishing a recirculation system so that the fluid may pass through the separation unit or units a number of times so as to lower the level of oil and possibly other contaminations in the water to such a low level that the almost pure water may be dumped into open sea without causing any significant pollution.

The content of oil in fluid pumped into the sea may be required by law to be below a certain level, such as lower than 5 ppm.

In a particular embodiment of the method according to the third aspect of the present invention the remaining part of the oily water stream may travel through the second aperture, the remaining part may have an oil to water ratio being less than the first oil to water ratio. As a part of the oil has been separated from the stream the remaining part of the stream has a lower oil to water ratio.

The following points may be considered as characterizing the invention:

A separation unit for separating oil from oily water having a first oil-to-water ratio comprises a body defining an inner chamber, and having a first end-wall and an opposite second end-wall, with first and second side-walls extending between the first end-wall and the second end-wall, the inner chamber being at least partly delimited by the first and second end-wall and the first and second side-walls; a third wall constituting a separation wall extending from the first end-wall towards the second end-wall and dividing the inner chamber into a first and a second sub-chamber; an inlet defined at the first side-wall and the first end-wall; a first outlet defined at the second side-wall and the first end-wall; a passage defined at the third wall and the second end-wall; a fluid path from the inlet passing through the first sub-chamber and the passage and the second sub-chamber to the first outlet; and a second outlet defined at the second end-wall, the second outlet defining an opening having an outlet area: wherein the fluid has a restricted flow at the first outlet compared to the flow at the inlet, so that a fraction of the fluid is separated from the fluid path through the second outlet, the fraction having a second oil-to-water ratio being higher that the first oil-to-water ratio.

The separation unit may be further characterized by the first and/or second outlet and/or the inlet defining any of a slit geometry, a substantial rectangular geometry, a substantial square geometry or a substantial round geometry.

The separation unit may be further characterized by the first sub-chamber defining a first volume and the second sub-chamber defining a second volume, the second volume being smaller than the first volume, thereby establishing the fluid restriction.

The separation unit may be further characterized by the first end-wall being constituted by two separate walls displaced relative to each other.

The separation unit may be further characterized by the first end-wall and the second end-wall being arranged so as to define an angle between 0 degrees and 90 degrees, such as approximately 45 degrees.

The separation unit may further comprise an oil sensor for sensing the presence of oil in the fluid and a valve at the first outlet, the valve being selectively operated from a closed state to an open state in response to a signal from the oil sensor indicating presence of oil in the fluid.

The separation unit may further comprise a pump connected at the inlet for establishing an elevated pressure in the fluid inside said separation unit.

A system for separating oil from oily water having a first oil-to-water ratio includes a plurality of separation units, each of the separation units comprising a body defining an inner chamber, and having a first end-wall and an opposite second end-wall, first and second side-walls extending between the first end-wall and the second end-wall, the inner chamber being at least partly delimited by the first and second end-walls and the first and second side-walls; a third wall constituting a separation wall extending from the first end-wall towards the second end-wall and dividing the inner chamber into a first and a second sub-chamber; an inlet defined at the first side-wall and the first end-wall; a first outlet defined at the second side-wall and the first end-wall; a passage defined at the third wall and the second end-wall; a fluid path from the inlet passing through the first sub-chamber and the passage and the second sub-chamber to the first outlet; and a second outlet defined at the second end-wall, the second outlet defining an opening having an outlet area; wherein the fluid has a restricted flow at the first outlet compared to the flow at the inlet, so that a fraction of the fluid is separated from the fluid path through the second outlet, the fraction having a second oil-to-water ratio being higher than the first oil-to-water ratio, and wherein the plurality of separation units arranged so that in a set of neighboring separation units, an inlet of one separation unit is in fluid communication with a second outlet of the other separation unit.

The system may define an overall box geometry, wherein the plurality of separation units is positioned sequentially along the length of the overall box geometry. The system may alternatively define an overall cylindrical geometry, wherein the separation units are positioned concentric relative to a center axis of the cylindrical geometry.

The system may be further characterized by the first sub-chamber defining a first volume and the second sub-chamber defining a second volume, the second volume being smaller than the first volume, wherein the plurality of separation units are arranged so that in a set of neighboring separation units, the second outlet of a first separation unit is connected to an inlet of a second separation unit, and the second sub-chamber of the first separation unit defines a volume larger than the volume defined by the first sub-chamber of the second separation unit.

The separation units in the system may be made from a non-corrosive material, such as stainless steel.

The system may further comprise an oil sensor for sensing the presence of oil in the fluid, and a valve at the first outlet, the valve being selectively operated from a closed state to an open state in response to a signal from the oil sensor indicating presence of oil in the fluid.

The system may further comprise an oil sensor for sensing the presence of oil in the fluid at each of the plurality of second outlets, and a valve at each of the second outlets, wherein each of the valves is selectively operated from a closed state to an open state in response to a signal from a specific one of the oil sensors indicating presence of oil in the fluid at a respective second outlet.

A separation unit in the system may further comprise a pump connected at the inlet for establishing an elevated pressure in said fluid inside the separation unit.

A separation unit in the system may be characterized by any of the following features: the first and/or second outlet and/or the inlet defining any of a slit geometry, a substantial rectangular geometry, a substantial square geometry or a substantial round geometry; the first sub-chamber defining a first volume and the second sub-chamber defining a second volume, the second volume being smaller than the first volume, thereby establishing the fluid restriction; the first end-wall being constituted by two separate walls displaced relative to each other; the first end-wall and the second end-wall being arranged so as to define an angle between 0 degrees and 90 degrees, such as approximately 45 degrees.

A method for separating oil from oily water comprises providing an oily water stream from an oily water source, the oily water stream having a first oil-to-water ratio; and providing a separation unit comprising a body defining an inner chamber, and having a first end-wall and an opposite second end-wall, first and second side-walls extending between the first end-wall and the second end-wall, the inner chamber being at least partly delimited by the first and second end-walls and the first and second side-walls; a third wall constituting a separation wall extending from the first end-wall towards the second end-wall and dividing the inner chamber into a first and a second sub-chamber; an inlet defined at the first side-wall and the first end-wall; a first outlet defined at the second side-wall and the first end-wall; a passage defined at the third wall and the second end-wall; a fluid path from the inlet passing through the first sub-chamber and the passage and the second sub-chamber to the first outlet; and a second outlet defined at said second end-wall, the second outlet defining an opening having an outlet area; wherein the fluid has a restricted flow at the first outlet compared to the flow at the inlet, so that a fraction of the fluid is separated from the fluid path through the second outlet, the fraction having a second oil to water ratio being higher than the first oil-to-water ratio. The method further includes introducing the oily water stream into the inlet so that the oily water stream travels along the fluid path, wherein a first part of the oily water stream is separated therefrom, the first part having a third oil-to-water ratio larger than the first oil-to-water ratio.

The method may be further characterized by having the remaining part of the oily water stream travel through the second outlet, wherein the remaining part has a fourth oil-to-water ratio smaller than the first oil-to-water ratio.

The method may be further characterized by the separation unit being positioned down-hole in an oil well, or in the alternative, on a platform, such as a boat or a barge or an oil rig.

The method may be further characterized by the separation unit being characterized by any of the following features: the first and/or second outlet and/or the inlet defining any of a slit geometry, a substantial rectangular geometry, a substantial square geometry or a substantial round geometry; the first sub-chamber defining a first volume and the second sub-chamber defining a second volume, the second volume being smaller than the first volume, thereby establishing the fluid restriction; the first end-wall being constituted by two separate walls displaced relative to each other; the first end-wall and the second end-wall being arranged so as to define an angle between 0 degrees and 90 degrees, such as approximately 45 degrees; the separation unit comprising an oil sensor for sensing the presence of oil in the fluid and a valve at the first outlet, the valve being selectively operated from a closed state to an open state in response to a signal from the oil sensor indicating presence of oil in the fluid; and the separation unit comprising a pump connected at the inlet for establishing an elevated pressure in the fluid inside said separation unit.

A basic implementation of the separation unit according to the first aspect or a system according to the second aspect may be positioned down-hole in an oil well, or in the alternative on a platform being a boat or a barge or an oil rig.

The method according to the third aspect of the present invention may be used by a unit or system incorporating any of the features of the unit according to the first aspect of the present invention and/or the system according to the second aspect of the present invention respectively.

It is contemplated that the unit according to the first aspect of the present invention, the system according to the second aspect of the present invention and the method according to the third aspect of the present invention will provide an efficient way of reducing the amount of water in fluids extracted from an oil well, which is desirable in view of the ever increasing demand for efficiency and profitability that governs all types of industries.

It is further contemplated that the unit, system and method may apply to separation of any mix of at least two fluids having two different densities. It is still further contemplated that the most efficient separation occurs when the flow through the unit or system is laminar.

BRIEF DESCRIPTION OF THE DRAWINGS

The three aspects of the present invention is now to be discussed in more detail with reference to the schematic drawings in the figures, wherein:

FIG. 1 is a schematic view of one embodiment of the present invention,

FIG. 2 is a schematic view of a valve,

FIG. 3 is a schematic view of a plate used in the first embodiment of the present invention.

DETAILED DESCRIPTION

Figure 4:
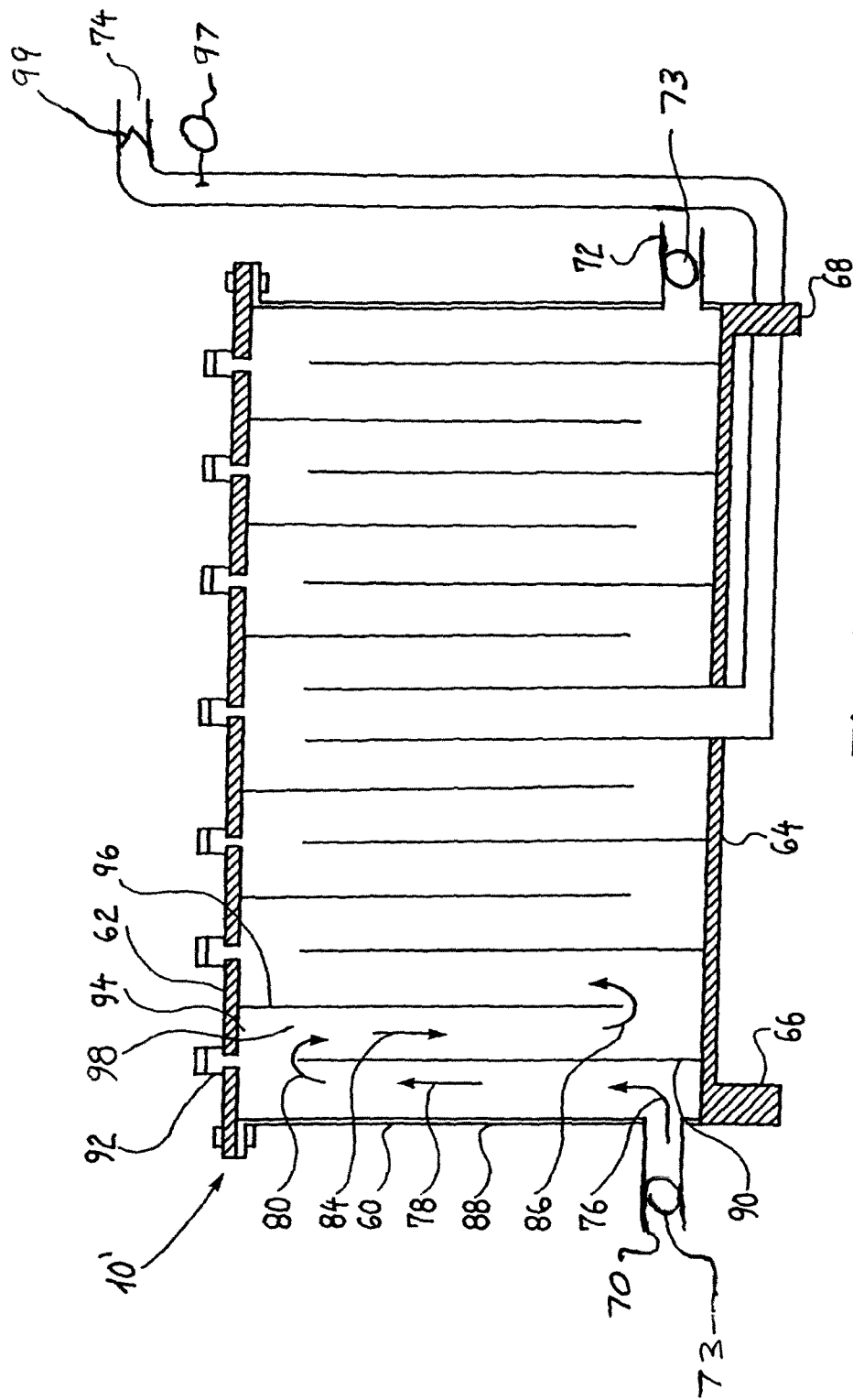
FIG. 4 is a schematic view of another embodiment of the present invention.

FIG. 1 schematically illustrates a cut-through view of one embodiment of a system 10 for separating oil from a fluid stream comprising an oil/water mix. The system 10 illustrated in FIG. 1 has a circular cross-section and an overall cylindrical geometry.

The system 10 illustrated in FIG. 1 is especially suitable for being positioned in down-hole in an oil well bore hole.

The system 10 comprises a bottom section 12 where fluid from the bore hole reaches the system 10. At the bottom of the system 10 a number of openings, all denoted by the reference numeral 14, constitute inlets. The openings 14 are located in a bottom plate 15 positioned near the outer rim part of the bottom of the system 10.

The fluid from the oil well comprises at least a mix of water and oil. The fluid may also comprise sand, mud, rocks and the like. Before reaching the system 10 the fluid may have passed through a filter for filtering relatively large rocks and the like from the fluid.

The fluid travels through a first chamber 16 defined by the walls 18 and 20. The fluid travels in the direction of the arrow 22.

The fluid may be pumped up from the well, either by placing a pump in the bore hole somewhere in the bore hole above the system 10 or directly coupled to the top part of the system, e.g. at the funnel 24. Alternatively water, or another fluid, may be pumped down into the bore hole, e.g. by returning the part of the fluid not being separated by the system 10.

At the end of the first chamber 16 the fluid enters a space 26 defined between the wall 20 and a top plate 28. In the plate 28 a number of openings all denoted 30 are formed. The openings 30 constitute a plurality of outlets. The area of the openings 30 is chosen or designed so that the flow through an outlet is restricted relative to the flow of the fluid in the channel or chamber 16. This is contemplated to ensure that fluid having a low density flowing near the opening travels through the opening 30 and the heavier fluid, e.g. water, will travel or flow as indicated by the arrow 32 into a second chamber 34 defined between the wall 20 and the wall 36.

The volume defined in the first chamber 16 is larger than the volume defined in the second chamber 34. This is contemplated to ensure that the pressure in the fluid throughout the system 10 is maintained. As fluids are almost incompressible, it is contemplated that the reduced volume from one chamber to the next will cause the lighter or less dense fluid to be pressed out through the openings 30 instead of entering the next chamber.

From the second chamber 34 the fluid enters a second space 38 where the fluid continues to travel as indicated by the arrow 40 to a third chamber 42.

The embodiment illustrated in FIG. 1 includes only one outlet in the path of travel defined through the system 10, as described above. However, more outlets may be formed. The number of outlets may at least depend on the physical size of the system 10. The size of the system may vary depending on the size of the bore hole that the system 10 is to be inserted in. As outlined earlier, no two bore holes or oil wells are identical. When drilling rocks, sandbanks, mud, water and the like may cause different properties in the ground in which the bore hole is formed, which again may lead to different shapes of the bore hole, including different hole diameters.

After the fluid has passed through the third chamber 42 the fluid enters a larger volume or space 44 at the centre of the system 10.

The funnel 24 at the top of the system 10 may receive water returned from above ground level, e.g. from a pump pumping seawater or fresh water into the well. Alternatively the water may be water separated from the liquid extracted from the oil well it self. The system 10 may be a first separator and one or more separator systems positioned above ground may further refine the separation of oil from the oily water in the oil well.

A main fluid path may be defined from the inlet through the chambers and further through the outlet at the bottom. Further minor fluid paths indicate the exit or separation of fluid from the main flow of fluid through the system 10. The system 10 shown in FIG. 1 may further include several more sub-chambers, which is contemplated to improve the separation of a lighter fluid, i.e. oil, from the mix of fluids, i.e. oily water.

FIG. 2 is a schematic view of the valve or flap 50 positioned in the channel below the funnel or funnel-shaped opening 24. The valve 50 is hinged at 54 for allowing the valve 50 to operate between an open state and a close state. The valve 50 is shown in an open state in FIGS. 1 and 2. The valve 50 comprises a plate or disk 56 hinged at 54 to the wall 52. The disk 56 comprises a central opening 58. The valve 50 is received in a recess 59 formed in the wall 52.

FIG. 3 is a schematic view of a plate used in the system 10 illustrated in FIG. 1. The plate may either be used as the top plate 28 or the bottom plate 15 at the lower part of the system 10.

The plate includes eight holes or openings 46, either constituting inlets or outlets depending on the use of the plate. Also the plate includes a larger inner or central opening 48.

In further embodiments such a plate may include more or less than the illustrated eight holes or openings. The plate at the top and the corresponding plate at the bottom need not include the same amount of openings.

FIG. 4 is a schematic illustration of a system 10' for separating oil from oily water. The system 10' comprises an outer side-wall 60; in the illustration shown the outer side-wall 60 has a circular cross-section and the system 10' defines an overall cylindrical geometry.

The system 10' further comprises a top 62 and a bottom 64 which together with the side-wall 60 forms a closed compartment. The bottom 64 is further provided with a number of legs or supports 66 and 68 as the system 10' is especially suited to be positioned on a surface preferably above ground or on, e.g., an oil rig, ship or barge. The system 10' may, in addition, be used for separating oil from oily water stemming from an oil well, be used to separate oil from oil water stemming from a ship's engine or the like.

The system 10' comprises inlets 70 and 72 for introducing oily water into the system 10'. The fluid or oily water enters the system 10' via the inlets 70 and 72. The fluid may be introduced through each of the inlets 70, 72 using a pump 73. The fluid travels as indicated by the arrow 76. The fluid enters a first compartment defining a first volume when travelling in the direction indicated by the arrow 78. The first chamber and the volume is defined at the walls 88 and 90. The fluid enters a space 94 near the top of the wall 90 and below the opening 92.

At the space 94 a part of the fluid, namely the part flowing on top, i.e. nearest the opening 92, is separated from the remaining part of the fluid. It is contemplated that the lightest part of the fluid will flow near the top when the unit or system is in normal operation. Preferably laminar flow is observed in the system 10', and correspondingly in the system 10 described above.

The fluid, following a path indicated by arrow 80 then enters a second chamber 98 or volume defined between the walls 90 and 96. The fluid then flows in the direction indicated by the arrow 84. The second chamber 98 is smaller than the first chamber. The difference in size is contemplated to enhance the separation of the lighter fluid, i.e., in most cases the oil, through the opening 92.

The fluid then travels into a following section in the direction indicated by the arrow 86.

The system 10' and 10 described above may be construed as being an arrangement of a number of sub-units each comprising a first chamber or volume in fluid communication with a second chamber or volume, which is smaller than the first volume. In between the two chambers a part of the fluid is separated from the main flow or part. The fluid entering the system or unit has a first oil to water ratio. The part of the fluid being separated from the main part has a second oil to water ratio being higher than the first oil to water ratio. This is contemplated to reduce the amount of oil in the remaining part of the fluid, and possibly also the concentration of oil in the remaining part of the fluid.

A pump (not shown) may also be connected at the outlet 74 for pumping out the fluid from the system 10'.

As indicated above the system 10' further includes an inlet at 72. The description above applies equally to fluid entering the system 10' at 72 and travelling along a fluid path from the inlet 72 to the outlet 74.

The system 10' may further include an oil sensor 97 for sensing the presence of oil near or at an outlet. The system 10' may advantageously include such a sensor at each of the outlets. The system 10' may still further advantageously comprise a valve 99 being operated selectively in response to a signal from such a sensor. When the presence of oil is detected the valve is operated from a closed state to an open state, and correspondingly from an open state to a closed state when oil is no longer detected by the sensor.

Figure 5:
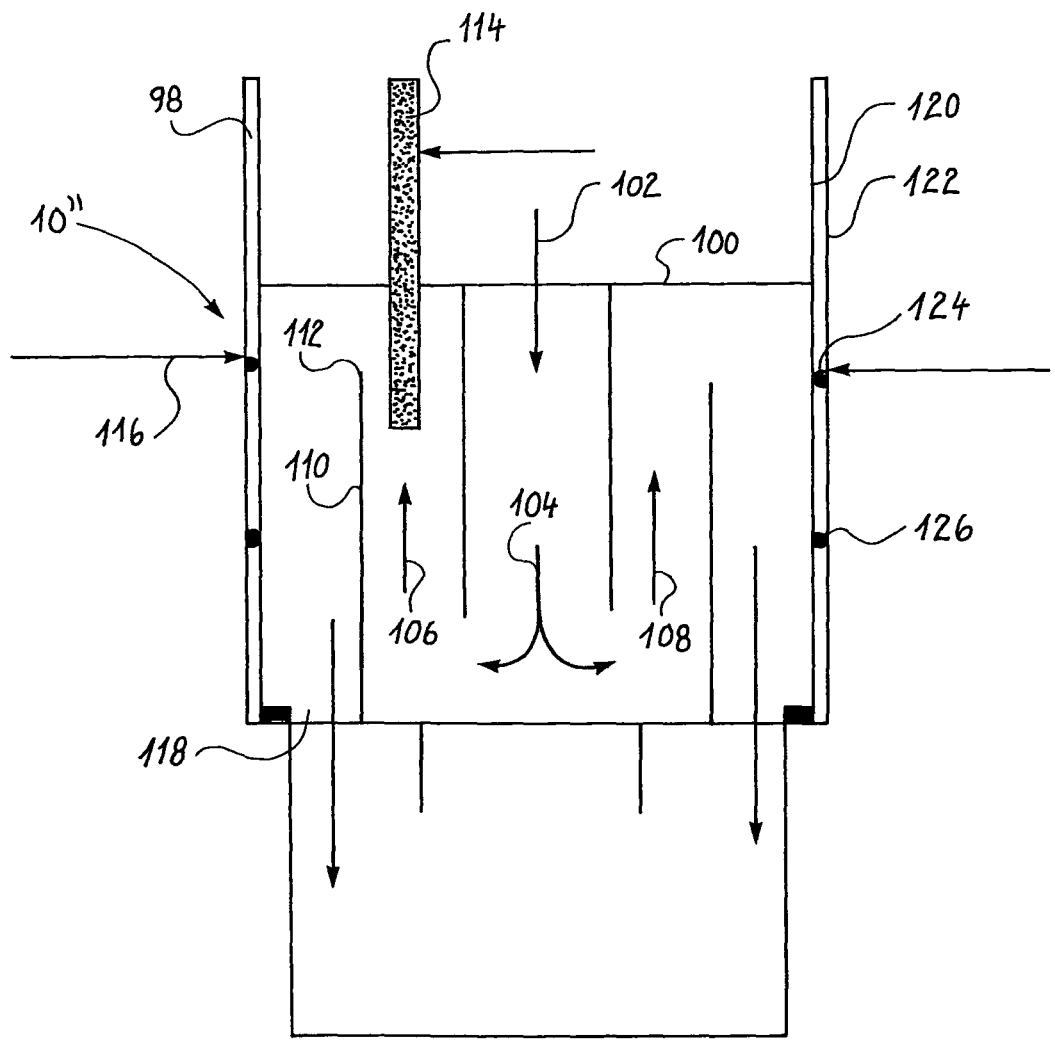
FIGS. 5 to 9 are schematic views of additional embodiments of systems with various numbers of chambers and oil outlets.

FIG. 5 is a schematic illustration of a system 10", representing one embodiment of a separator system according to the present invention. The system 10" comprises an outer body 98 and receives a mix of oil and water at 100 in the direction of the arrow 102.

The oily water travels into the interior of the body 98 and further in the direction of the arrows 104. The body 98 is cylindrical. The oily water travels still further in the direction of the arrows 106 and 108. The oily water travels along the wall 110, which includes a top part 112. At a distance from the top part 112 an oil outlet 114 is positioned. A pump may optionally be connected to the oil outlet 114.

The body 98 is partly submerged in water, the water level preferably around or near the area of the top 112. In the embodiment shown in FIG. 5 the water level is indicated by the arrow 116.

As in the above described embodiments, the chambers defined in the body 98 have a decreasing volume looking from the inlet 100 to a fluid outlet 118. Due to the reduced volume it is contemplated that the oily part of the oily water will be located near the area of the outlet 114 when the oily water changes flow direction at the top 112.

In line with the above embodiments, the system in FIG. 5 will separate a fraction of oil or oily water with a high oil to water ratio compared to the oil to water ratio in the stream travelling around the top 112.

The outer body 98 comprises two plates 120 and 122 with two O-rings 124, 126 between them.

Figure 6:
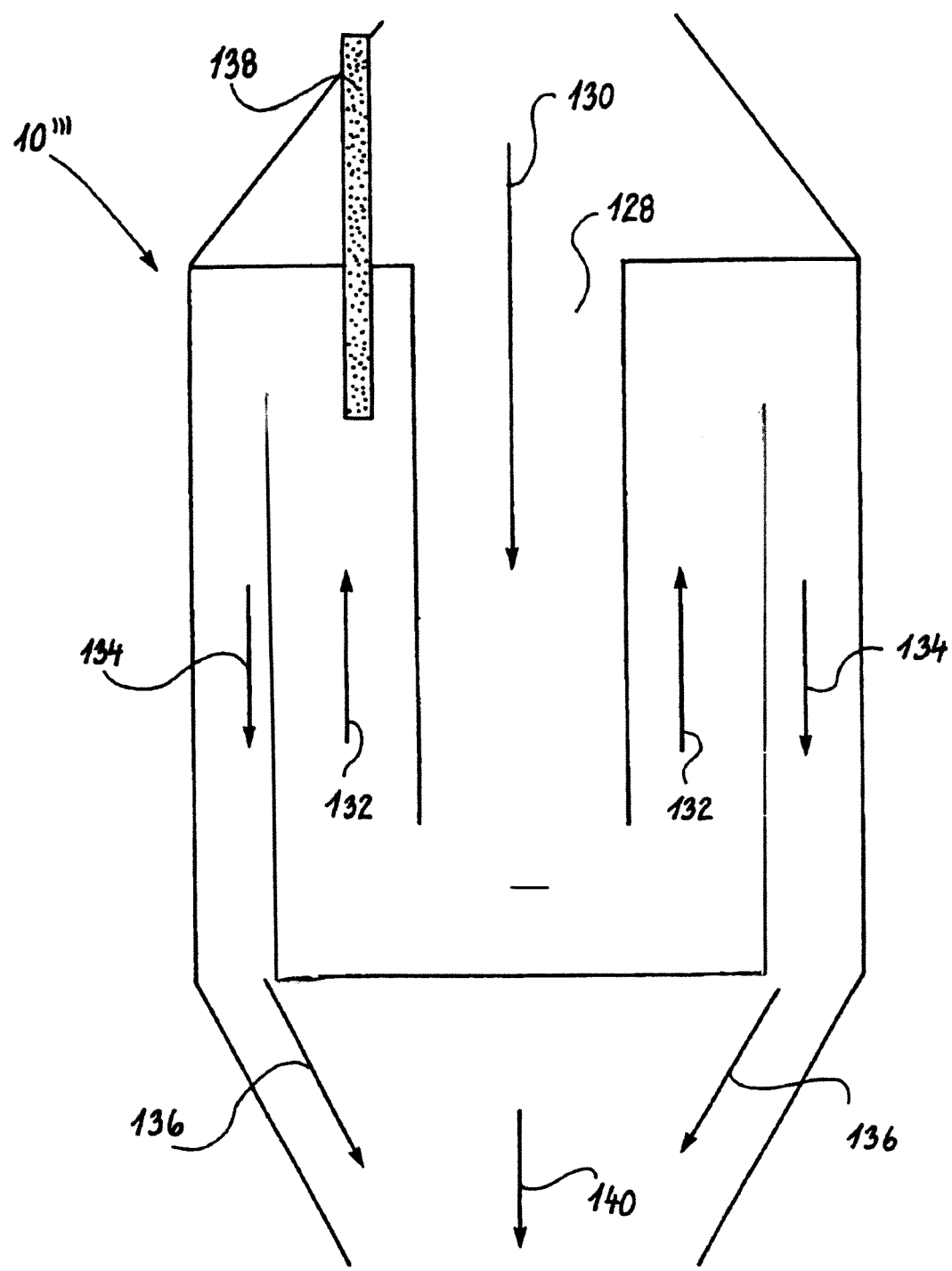

FIG. 6 schematically illustrates an embodiment of a system 10'" according to the present invention.

The system 10'" received oily water at 128 in the direction of the arrow 130. The water travels along the path outlined by the arrows 130, 132, 134 and 136. A fraction of the oily water, i.e. the fluid, is separated from the flow via the outlet 138.

The remaining oily water or fluid is output via a fluid outlet at 140.

Figure 7:
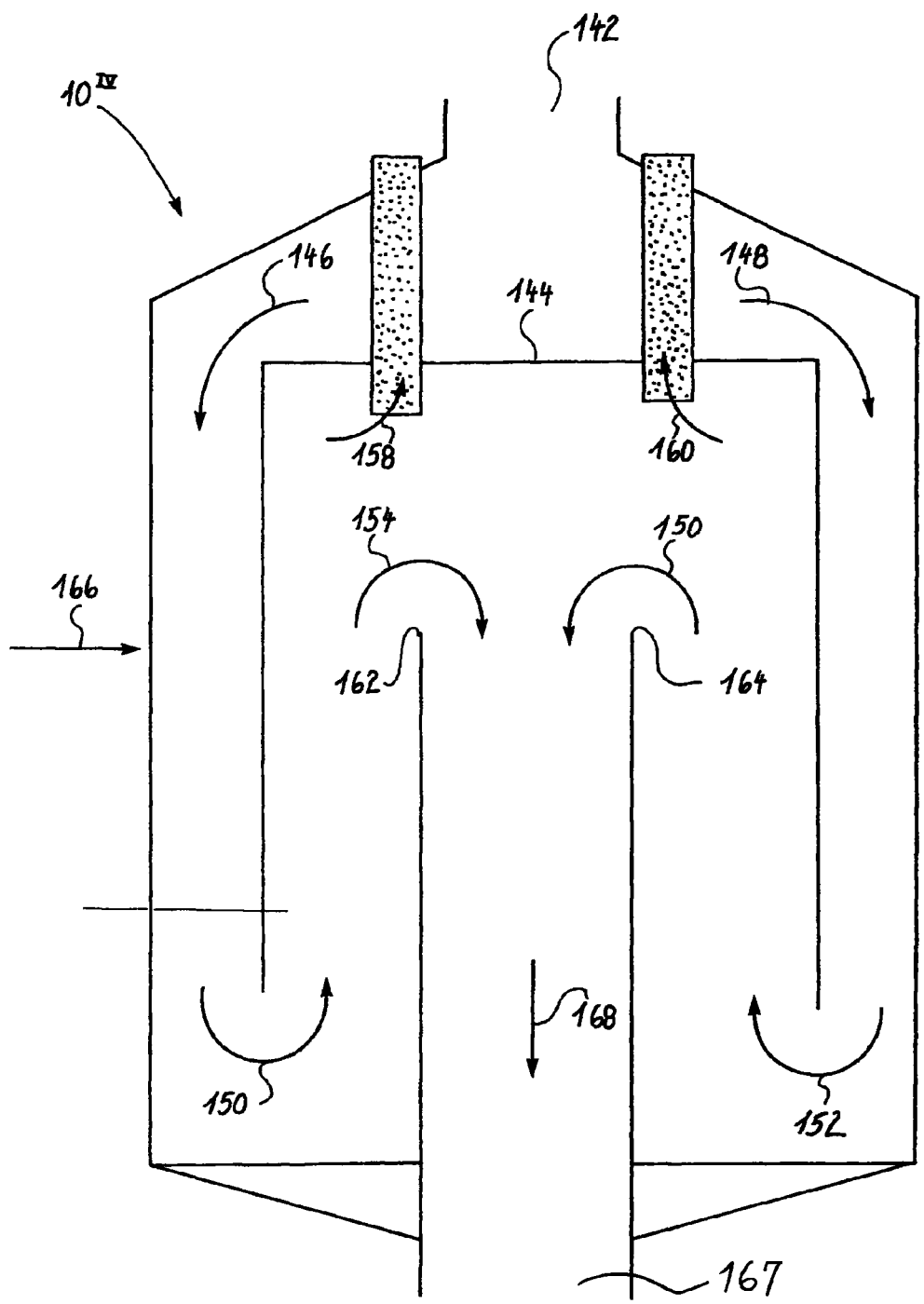

FIG. 7 is a further embodiment of a system 10$^{IV}$ according to the teachings of the present invention. Oily water is received via an inlet 142. The stream of oily water distributes over a plate 144 in the direction of the arrows 146 and 148. The fluid travels downward and changes direction as indicated by the arrows 150 and 152. At the internal wall tops 162 and 164, the fluid changes direction again, as indicated by the arrows 154 and 156. The system 10$^{IV}$ is advantageously submerged to a water level indicated by the arrow 166.

Two oil outlets 158 and 160 are illustrated. More outlets may be included in other embodiments. As in the above embodiments, a fraction of the fluid is separated from the flow or stream flowing through the system 10$^{IV}$. The remaining part of the fluid is output via a fluid output 167 in the direction 168.

The illustration in FIG. 7 is not to scale, and the chambers or compartments defined between the walls have a reduced volume as described in relation to the other figures.

Figure 8:
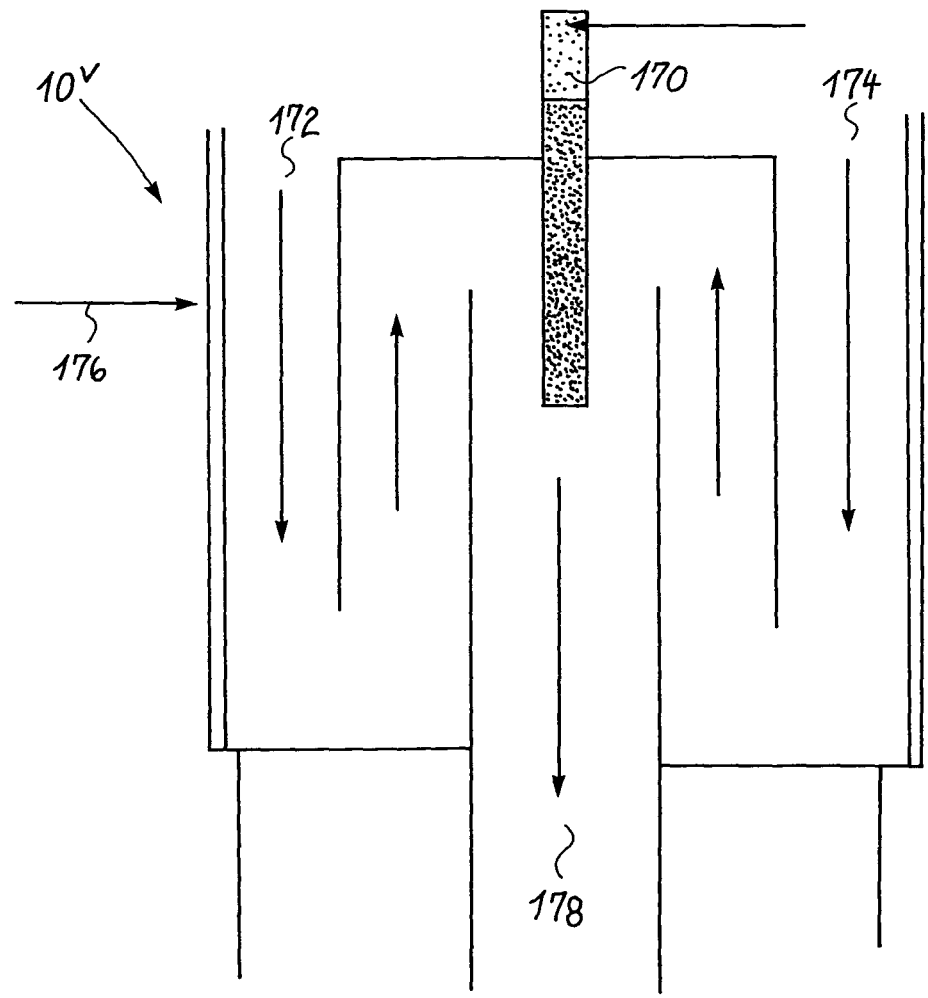

FIG. 8 is a schematic illustration of a system 10$^{V}$ according to the present invention. The system 10$^{V}$ comprises a single outlet at the centre of the system 10$^{V}$.

Fluid is supplied at inlets 172 and 174. The system 10$^{V}$ has a circular cross-section.

An outlet 170 may be constituted by a pipe or tube. In some embodiments the pipe or tube may include a plurality of holes where oil may enter the oil outlet 170.

The remaining part of the fluid exits the system 10$^{V}$ at a fluid outlet 178. The system 10$^{V}$ is preferably submerged to a water level indicated by the arrow 176

Figure 9:
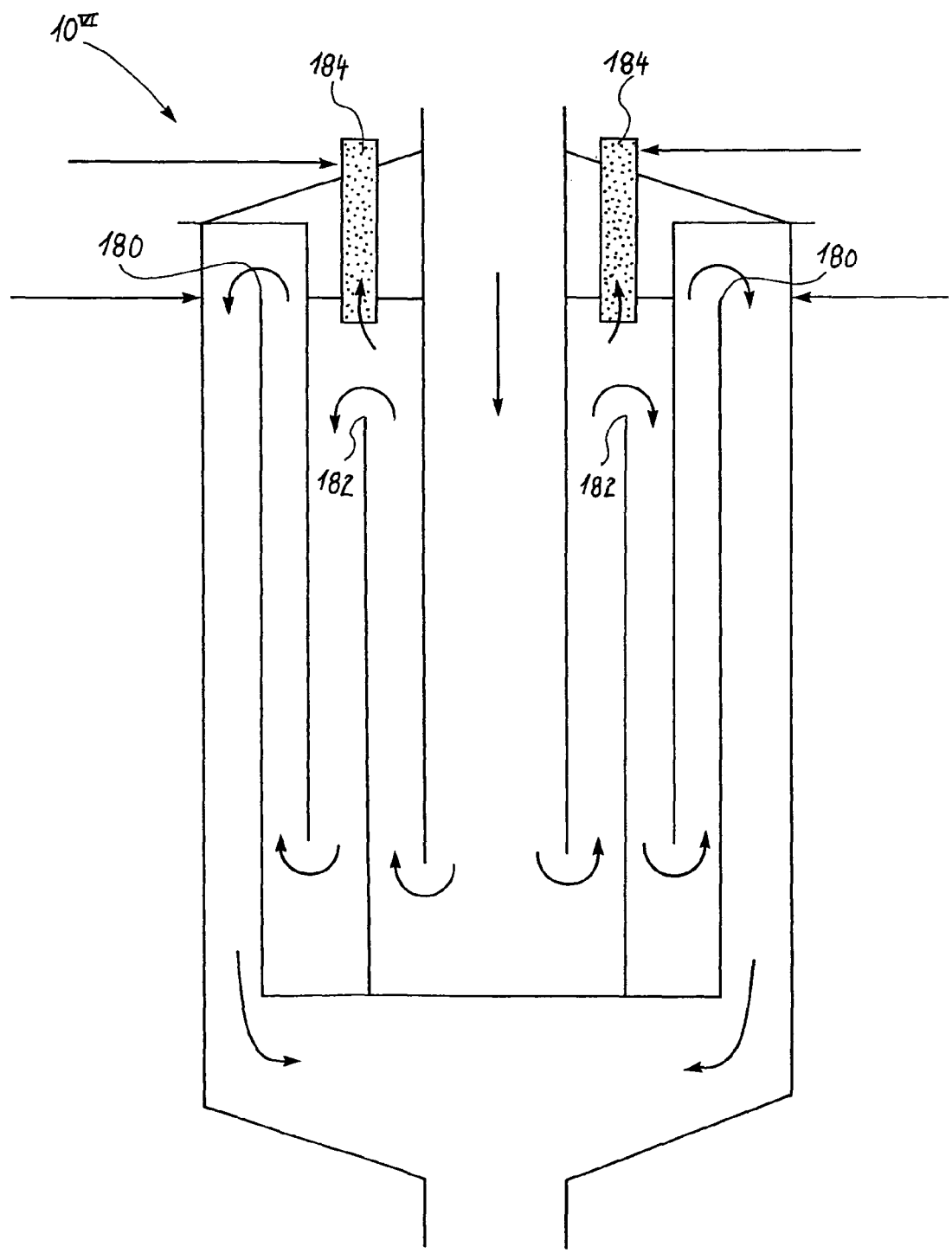

FIG. 9 is a schematic illustration of a system 10$^{VI}$ according to the teachings of the present invention. The system 10$^{VI}$ comprises two levels of top or turning points, namely at 180 and 182. The points are spatially displaced, transposed or shifted in a direction parallel with the length or long direction of the system 10$^{VI}$.

The system 10$^{VI}$ includes oil outlets 184 for separating a fraction of the fluid from the stream flowing through the system 10$^{VI}$.

Although not illustrated, the system may comprise more oil outlets, e.g. 4, 6, 8 10 or 5, 7, 9 or more.

All embodiments of systems described herein may include or be connected to a pump via the outlets, and may further include oil sensors for detecting the presence of oil, as described elsewhere. Further, the oil outlets may include shutters or closing means for selectively closing and opening the outlets in response to a signal from the above mentioned sensor, or from a signal from an operator.

It is contemplated that the below equations apply for wells wherein a system according to the present invention may be used.

The production characteristics obtained from a well test consist of:
Nature of Fluid:
Fluid properties;
Viscosity,
Specific Gravity (S.G.)
Z (From PVT analysis.)
Production Conditions e.g. pressure and temperature.
Production Potential—function of the flowing mechanism.
Permeability: Ability to flow through the formation, (measured in millidarcy).
Effective Porosity: Interconnected pore space/total volume (Rock+void)
Compressibility: ct total compressibility (measured as psi−1)
Viscosity: my Measured in centripoise (cp)
Formation thickness, Wellbore radius, wellbore condition.

All the data collected in a well Test are used e.g in a HORNER EQUATION $$kh = \frac{162.6quB}{m}$$

kh=Permeability thickness
q=Flow rate, bbls/day (From Production Testing Services)
m=Fluid viscosity, cp (from sampling & PVT Services)
B=Formation volume factor, rvb/stb
m=Horner slope, psi/log cycle (From Real Time)
Pressure gauges (E/L) Pressure records Drill Stem Test and Slickline)

Then the Horner Log Plot is the most common technique for analyzing a pressure build up in the reservoir (BHP).

2: Calculate the Size of the Oil Outlet Nozzles in the top of the Down Hole separator.
Establish the Nozzle/Choke Sizes:

The theoretical equation describing the relationship between upstream pressures, gas or liquid ratios, bean sizes (THE NOZZLE) and flow rates at in field units is as follows:

$$Pwhf = \frac{600R^{0.5}q}{2S_S}$$

R=GLR
q=Flow Rate
S=Nozzle size (Choke size)
Pwhf=WHP (Well Head Pressure) Well Flowing psia.

For the nature of this equation, we see that for A gives orifice size and GLR; the well head pressure plot as a straight line function of the flow rate.

The invention claimed is:

1. A separation unit for separating oil from a fluid comprising oil and water in a first oil-to-water ratio, the separation unit comprising:
    a housing defining an inner chamber having a bottom end defined by a first end-wall, a top end defined by a second end-wall, and one or more side-walls extending between the first end-wall and the second end-wall, the inner chamber being at least partly delimited by the first end-wall, the second end-wall, and the one or more side-walls;
    a first set of separation walls extending from the first end-wall towards the second end-wall and defining a first set of fluid passages below the second end-wall and above the separation walls of the first set;
    a second set of separation walls extending from the second end-wall towards the first end-wall and defining a second set of fluid passages above the first end-wall and below the separation walls of the second set, the second set of separation walls being interlayered between the first set of separation walls;
    an inlet into the inner chamber at or near the bottom end thereof;
    a first outlet from the inner chamber at or near the bottom end thereof;
    a set of further outlets from the inner chamber above the separation walls of the first set of separation walls;
    a fluid path extending from the inlet to the first outlet within the inner chamber, the fluid path passing through the first set of fluid passages and the second set of fluid passages and having a gradually increasing flow restriction from the inlet to the first outlet so as to separate fractions of the fluid having higher oil-to-water ratios than the first oil-to-water ratio flowing from the fluid path to the set of further outlets, and so as to expel fluid having a lower oil-to-water ratio than the first oil-to-water ratio from the first outlet; and a pump connected at the inlet and operable to establish an elevated pressure of the fluid throughout the fluid path.

2. The separation unit of claim 1, wherein the separation walls of the first and second sets define a plurality of sub-chambers between the first inlet and the first outlet.

3. The separation unit of claim 2, wherein the gradually increasing flow restriction along the fluid path is established by volumetric reduction of successive sub-chambers along the fluid path.

4. The separation unit of claim 3, wherein the volumetric reduction is in the range of about 0.5%-50% from one sub-chamber to the succeeding sub-chamber.

5. The separation unit of claim 1, wherein the first set of separation walls includes a first number of separation walls, and the second set of separation walls includes a second number of separation walls that is one less than the first number.

6. The separation unit of claim 1, wherein the first end-wall comprises two separate walls displaced relative to each other.

7. The separation unit of claim 1, wherein the first end-wall and the second end-wall are arranged so as to define an angle between 0 degrees and 90 degrees.

8. The separation unit of claim 1, further comprising:
an oil sensor configured to generate an oil presence signal in response to the presence of oil in the fluid; and
a valve at the first outlet, the valve being selectively operable from a closed state to an open state in response to the oil presence signal.

9. The separation unit of claim 1, wherein the pump is further operable to establish laminar fluid flow in the fluid path.

10. A system for separating oil from a fluid comprising oil and water in a first oil-to-water ratio, the system comprising a plurality of separation units, each of the separation units comprising:
a housing defining an inner chamber and having a bottom end defined by a first end-wall, a top end defined by a second end-wall, and one or more side-walls extending between the first end-wall and the second end-wall, said inner chamber being at least partly delimited by the first end-wall, the second end-wall, and the one or more side-walls;
a first set of separation walls extending from the first end-wall towards the second end-wall and defining a first set of fluid passages below the second end-wall and above the separation walls of the first set;
a second set of separation walls extending from the second end-wall towards said first end-wall and defining a second set of fluid passages above the first end-wall and below the separation walls of the second set, the second set of separation walls being interlayered between the first set of separation walls;
an inlet into the inner chamber at or near the bottom end thereof;
a first outlet from the inner chamber at or near the bottom end thereof;
a set of further outlets from the inner chamber above the separation walls of the first set of separation walls; and
a fluid path extending from the inlet to the first outlet within the inner chamber, the fluid path passing through the first set of fluid passages and the second set of fluid passages and having a gradually increasing flow restriction from the inlet to the first outlet so as to separate fractions of the fluid having higher oil-to-water ratios than the first oil-to-water ratio flowing from the fluid path to the set of further outlets, and so as to expel fluid having a lower oil-to-water ratio than the first oil-to-water ratio from the first outlet;
wherein the separation units in the plurality of separation units are arranged so that an inlet of one separation unit is in fluid communication with one of the further outlets of another separation unit; and
wherein at least one of the separation units further comprises a pump connected at the inlet and operable to establish an elevated pressure of the fluid throughout the fluid path.

11. The separation system of claim 10, wherein the separation walls of the first and second sets define a plurality of sub-chambers between the first inlet and the first outlet.

12. The separation system of claim 11, wherein the first end-wall and the second end-wall are arranged so as to define an angle between 0 degrees and 90 degrees.

13. The separation system of claim 11, wherein the first set of separation walls includes a first number of separation walls, and the second set of separation walls includes a second number of separation walls that is one less than the first number.

14. The separation system of claim 13, wherein the gradually increasing flow restriction along the fluid path is established by volumetric reduction of successive sub-chambers along the fluid path.

15. The separation system of claim 14, wherein the volumetric reduction is in the range of about 0.5%-50% from one sub-chamber to the succeeding sub-chamber.

16. The separation system of claim 10, wherein the first end-wall comprises two separate walls displaced relative to each other.

17. The separation system of claim 11, wherein at least one of the separation units further comprises:
an oil sensor configured to generate an oil presence signal in response to the presence of oil in the fluid; and
a valve at the first outlet, the valve being selectively operable from a closed state to an open state in response to the oil presence signal.

18. The separation system of claim 10, wherein the pump is further operable to establish laminar fluid flow in the fluid path.

19. A method for separating oil from a fluid comprising oil and water in a first oil-to-water ratio, the method comprising:
(a) providing a fluid comprising oil and water in a first oil-to-water ratio;
(b) providing a separation unit, comprising:
a housing defining an inner chamber having a bottom end defined by a first end-wall, a top end defined by a second end-wall, and one or more side-walls extending between the first end-wall and the second end-wall, the inner chamber being at least partly delimited by the first end-wall, the second end-wall, and the one or more side-walls;
a first set of separation walls extending from the first end-wall towards the second end-wall and defining a first set of fluid passages below the second end-wall and above the separation walls of the first set;
a second set of separation walls extending from the second end-wall towards the first end-wall and defining a second set of fluid passages above the first end-wall and below the separation walls of the second set, the second set of separation walls being interlayered between the first set of separation walls;

an inlet into the inner chamber at or near the bottom end thereof;

a first outlet from inner chamber at or near the bottom end thereof;

a set of further outlets from the inner chamber above the separation walls of the first set of separation walls; and a fluid path extending from the inlet to the first outlet within the inner chamber, the fluid path passing through the first set of fluid passages and the second set of fluid passages and having a gradually increasing flow restriction from the inlet to the first outlet;

(c) separating fractions of the fluid having higher oil-to-water ratios than the first oil-to-water ratio from the fluid path to the set of further outlets;

(d) expelling fluid having a lower oil-to-water ration than the first oil-to-water ration from the first outlet; and (e) elevating the pressure of the fluid throughout the fluid path using a pump connected at the inlet.

20. The method of claim 19, wherein the first and second sets of separation walls of the separation unit define a plurality of sub-chambers between the first inlet and the first outlet.

21. The method of claim 19, wherein the first set of separation walls of the separation unit includes a first number of separation walls, and the second set of separation walls of the separation unit includes a second number of separation walls that is one less than the first number.

22. The method of claim 21, wherein the gradually increasing flow restriction along the fluid path of the separation unit is established by volumetric reduction of successive sub-chambers along the fluid path.

23. The method of claim 22, wherein the volumetric reduction is in the range of about 0.5%-50% from one sub-chamber to the succeeding sub-chamber.

24. The method of claim 19, wherein the first end-wall comprises two separate walls displaced relative to each other.

25. The method of claim 19, wherein the first end-wall and the second end-wall of the separation unit are arranged so as to define an angle between 0 degrees and 90 degrees.

26. The method of claim 19, further comprising:

(f) sensing the presence of oil in the fluid;

(g) generating an oil presence signal in response to the presence of oil in the fluid; and (h) opening a valve at the first outlet in response to the oil presence signal.

27. The method of claim 19, wherein a laminar fluid flow in the fluid path is established when the pressure of the fluid is elevated.

* * * * *